US008510669B2

(12) United States Patent
Schiller

(10) Patent No.: US 8,510,669 B2
(45) Date of Patent: Aug. 13, 2013

(54) METHOD AND SYSTEM FOR PRESENTING PHOTOS ON A WEBSITE

(75) Inventor: Scott Schiller, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 755 days.

(21) Appl. No.: 11/432,033

(22) Filed: May 10, 2006

(65) Prior Publication Data

US 2007/0186178 A1 Aug. 9, 2007

Related U.S. Application Data

(60) Provisional application No. 60/765,888, filed on Feb. 6, 2006.

(51) Int. Cl.
*G06F 15/00* (2006.01)
*G06F 13/00* (2006.01)

(52) U.S. Cl.
USPC .......................................... 715/769; 715/838

(58) Field of Classification Search
USPC .................................................. 715/769, 838
See application file for complete search history.

(56) References Cited

U.S. PATENT DOCUMENTS

| 5,060,135 | A  | * | 10/1991 | Levine et al. ................. 715/769 |
| 6,344,864 | B1 | * | 2/2002  | Watanabe ..................... 715/788 |
| 6,453,078 | B2 | * | 9/2002  | Bubie et al. .................. 382/305 |
| 6,583,799 | B1 | * | 6/2003  | Manolis et al. ............... 715/838 |
| 6,993,712 | B2 | * | 1/2006  | Ramachandran et al. .... 715/234 |
| 7,117,453 | B2 | * | 10/2006 | Drucker et al. ............... 715/833 |
| 7,391,423 | B1 | * | 6/2008  | Manzari et al. ............... 345/619 |
| 2004/0143598 | A1 | * | 7/2004 | Drucker et al. ............ 707/104.1 |
| 2004/0250205 | A1 |   | 12/2004 | Conning |
| 2005/0114373 | A1 | * | 5/2005 | Kulp et al. .................... 707/101 |
| 2005/0188326 | A1 | * | 8/2005 | Ikeda ............................. 715/788 |
| 2005/0210414 | A1 | * | 9/2005 | Angiulo et al. ............... 715/838 |
| 2005/0223329 | A1 | * | 10/2005 | Schwartz et al. ............. 715/711 |
| 2006/0059440 | A1 | * | 3/2006 | Pry ................................ 715/838 |
| 2006/0070007 | A1 | * | 3/2006 | Cummins et al. ............. 715/769 |
| 2006/0075362 | A1 | * | 4/2006 | Moteki et al. ................. 715/838 |
| 2006/0181736 | A1 | * | 8/2006 | Quek et al. ................... 358/1.18 |
| 2007/0186189 | A1 |   | 8/2007 | Schiller |

OTHER PUBLICATIONS

Keyboard Shortcuts for Windows. Microsoft, Help and Support [online], [retrieved on Jun. 25, 2008]. Retrieved from the Internet <URL:http://web.archive.org/web/20050207124604/http://support.microsoft.com/kb/126449>.*
Human-Computer Interface Design, [online]. [retrieved on 2008-07-2008] Retrieved from the Internet <URL:http://web.archive.org/web/20000602132025/http://www.usask.ca/education/coursework/skaalid/theory/interface.htm>.*

(Continued)

*Primary Examiner* — Tadeese Hailu
*Assistant Examiner* — Darrin Hope
(74) *Attorney, Agent, or Firm* — James J. DeCarlo; Greenberg Traurig, LLP

(57) ABSTRACT

Method and system for presenting photos on a website are disclosed. The method includes selecting one or more thumbnail images in a browser window on a website in response to a select command from a user, dragging the one or more thumbnail images to a drop target in response to a drag command from the user, displaying the one or more thumbnail images in transit to the drop target as collapsible thumbnail images, and dropping the collapsible thumbnail images to the drop target in response to a drop command from the user.

31 Claims, 12 Drawing Sheets

(56) References Cited

OTHER PUBLICATIONS

AOL Pictures. "AOL Pictures," located at <http://pictures.aol.com> last visited on Feb. 12, 2007, 3 pages.

Snapfish by HP. "Welcome Back!" located at <http://www1.snapfish.com/welcomenphu> last visited on Feb. 12, 2007, 3 pages.

Walgreens. "Walgreens Photo Center," located at <http://photo.walgreens.com/> last visited on Feb. 12, 2007, 3 pages.

Walmart. "Welcome to the New Digital Photo Center," located at <http://www.walmart.com/photo/login.do;jsessionid=000000011ae34d243fc7e0739c3fac543fd6283102b7fc3e> last visited on Feb. 12, 2007, 3 pages.

* cited by examiner

METHOD AND SYSTEM FOR PRESENTING PHOTOS ON A WEBSITE

CROSS-REFERENCE TO RELATED APPLICATION

This application claims the benefit of application No. 60/765,888, "Method and System for Presenting Photos on a Website," filed Feb. 6, 2006, which is incorporated herein in its entirety by reference.

FIELD OF THE INVENTION

The present invention relates to the field of Internet applications. In particular, the present invention relates to a method and system for presenting photos on a website.

BACKGROUND OF THE INVENTION

With the increasing popularity of the Internet and digital photography, the Internet becomes a platform for millions of users to store, print, and share digital photos via various online photo service providers. Snapfish is an example of a conventional online photo service provider. The process typically involves taking photos with a digital camera and uploading the digital photos to an online photo service provider's website. From there, a user may view, print, or share the digital photos with friends and family members. Typically, the user would access the online photo service provider's website using a uniform resource locator (URL) and a unique login and password. The user may then manipulate the digital photos, such as create multiple albums, provide image names, send images to friends and family, and provide shared access to certain images. Alternatively, websites may serve as a general repository, for example as a posting website, and anyone using the correct URL would have access to the images.

One problem with conventional online photo service providers' websites is that they do not provide the same ease of use the user is accustomed to on her computer. For example, conventional websites would provide a browser window and allow a user to select her photos by clicking a selection box associated with each photo image within the browser window on the website; or by clicking a "select all" box that would select all the photos. However, if the user wants to select a group of the photos, for example twenty photos from a particular trip, the user would have to select one photo at a time, which is a time consuming process.

Another problem with conventional photo websites is that while a group of thumbnail images are being selected and dragged, the thumbnail images remain to be the same size while they are being moved, which often block the view of a large portion of the browser window. Moreover, the conventional photo website does not inform the user the number of thumbnail images being dragged. Yet another problem with convention photo websites is that the browser window does not display the maximum number of digital photo images while the size of the browser has been changed.

Yet another problem with the conventional photo websites is that the user's interim selection of the photos is not preserved when the user navigates to another web page, for example to retrieve other information. Thus, when the user returns to the web page of the conventional photo service provide, the previously photo selection may not have been recorded. This is particularly burdensome when the user needs to go to different websites to gather multiple photos for a photo album.

Yet another problem of the conventional photo websites is that when selecting from a large collection of digital photos, the user would have to traverse the browser window up and down multiple times in order to move a selection of thumbnail images from subsequent pages to the first page of the browser window for storage. This is because the storage location of the user's photo selection is typically displayed in the first page. When the user navigates to the subsequent pages, the storage location is no longer in the current view of the browser window. Such method of selecting photos by traversing up and down the browser window is inefficient and not easy to use.

Therefore, there is a need for a system and method that address these issues of the conventional photo websites. In particular, there is a need for a method and system for presenting photos on a website.

SUMMARY

In one embodiment, a method for presenting photos on a website includes selecting one or more thumbnail images in a browser window on a website in response to a select command from a user, dragging the one or more thumbnail images to a drop target in response to a drag command from the user, displaying the one or more thumbnail images in transit to the drop target as collapsible thumbnail images, and dropping the collapsible thumbnail images to the drop target in response to a drop command from the user.

In another embodiment, a system for presenting photos on a website includes one or more servers for interfacing between client devices through a communication network. The one or more servers further includes logic for selecting one or more thumbnail images in a browser window on a website in response to a select command from a user, logic for dragging the one or more thumbnail images to a drop target in response to a drag command from the user, logic for displaying the one or more thumbnail images in transit to the drop target as collapsible thumbnail images, and logic for dropping the collapsible thumbnail images to the drop target in response to a drop command from the user.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

DESCRIPTION OF EMBODIMENTS

Methods and systems are provided for presenting photos within a browser on a website. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
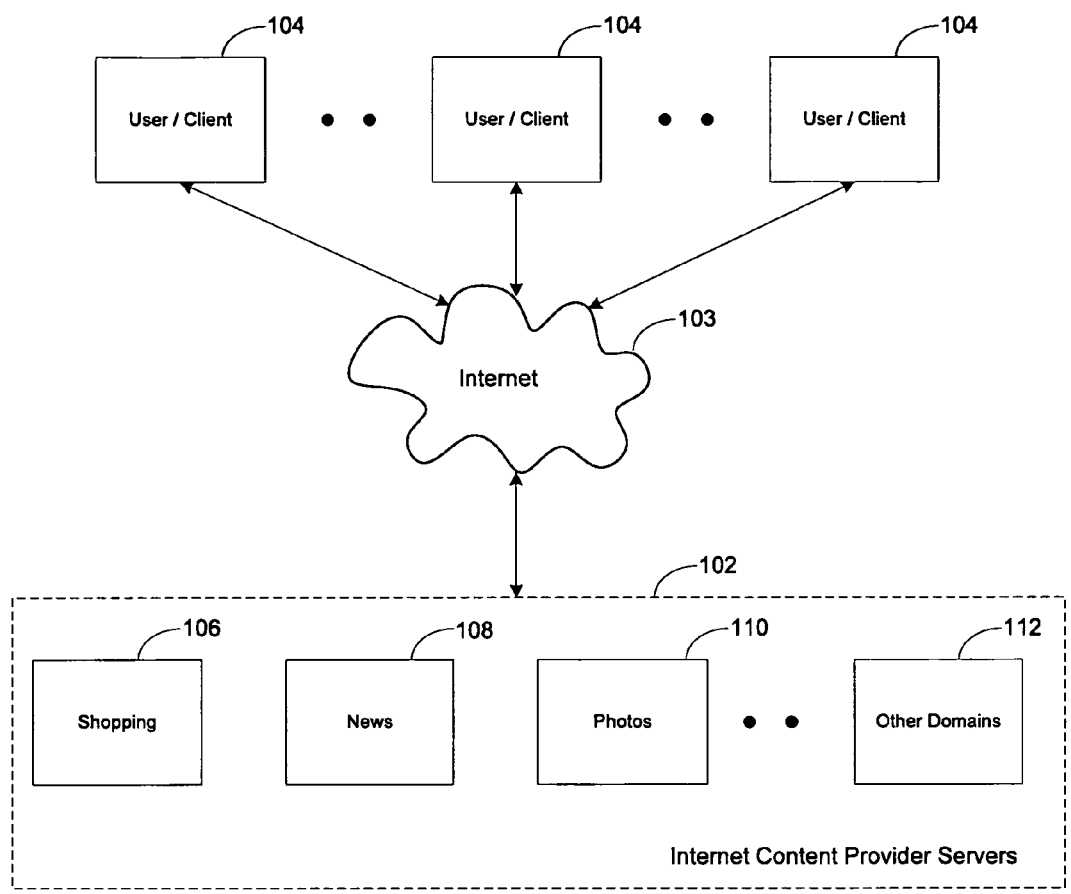
FIG. 1 illustrates a system for presenting photos on a website within a browser according to an embodiment of the present invention.

FIG. 1 illustrates a system for presenting photos on a website within a browser according to an embodiment of the present invention. The system includes one or more Internet content provider servers 102, and one or more clients 104. The servers 102 interface with the clients 104 via the Internet 103. The servers further include a plurality of individual domains, for example, shopping domain 106, news domain 108, photos domain 110 and other domains 112. A domain is a computer system implemented with different hardware and software for a specific application, such as the shopping applications, news applications, and photo applications. The photo applications of the present invention are run on the photos domain 110, which implement Web 2.0 functionalities using a combination of HTML, CSS, JavaScript and "Asynchronous JavaScript and XML" (AJAX).

In particular, JavaScript is used to create, monitor, change and destroy objects and change the state of various photo-related objects, in addition to keeping track of browser behavior changes initiated by the user. For example, when a user starts dragging an original thumbnail image in the browser window, the browser fires "mouse down" and "mouse move" events which are captured by the JavaScript, and an object is created to handle the event. The object is effectively a copy of the original thumbnail image, and the copy of the image is being moved around. When the object is put into the tray, it is added to the tray controller object, which monitors this new object being added to it and continues to keep track of the object. Similarly, when the user drags a thumbnail image out and removes the image from the photo tray, the browser fires "mouse down", "mouse move", and "mouse up" events which are captured and result in the removal of the item from the tray, removing the grayed-out effect of the original thumbnail image and allowing this image to be selectable again. In other words, each object has states, and such states are created and modified in response to user initiated changes (events) to the browser behavior.

As described above, the process of monitoring and updating states of an object is event driven. When a user performs a specific action, JavaScript that runs in the background determines the exact browser event that has been initiated according to a set of user cases. For example, if the user clicks outside of a photo and drags, that action is interpreted as the intent to draw a selection rectangle. Similarly, if the user clicks directly on an image and starts to move by a distance greater than five pixels, that action is interpreted as a drag. Then, the JavaScript starts to monitor the mouse movement and attaches the thumbnail images to the cursor at that point. While moving the cursor, the JavaScript updates the attached images' positions and waits for the user to release the image. Upon the images being released, the JavaScript determines the location of the cursor within the browser window. If the images are dropped on the photo tray, they are appended alongside the other images in the tray. If the images are dropped on an invalid drop target, a reset action is initiated and the images are snapped back to their original locations. While the user is dragging thumbnail images, the JavaScript monitors where the cursor is, and determines whether it is over a valid drop target or an invalid drop target. In the case that the cursor is over a valid drop target, the JavaScript would cause the valid drop target to be highlighted, providing a positive feedback to the user. When the cursor moves out of the valid drop target, the JavaScript would deactivate the highlighted area. This series of events is also referred to as the "hover" effect.

Figure 2A:
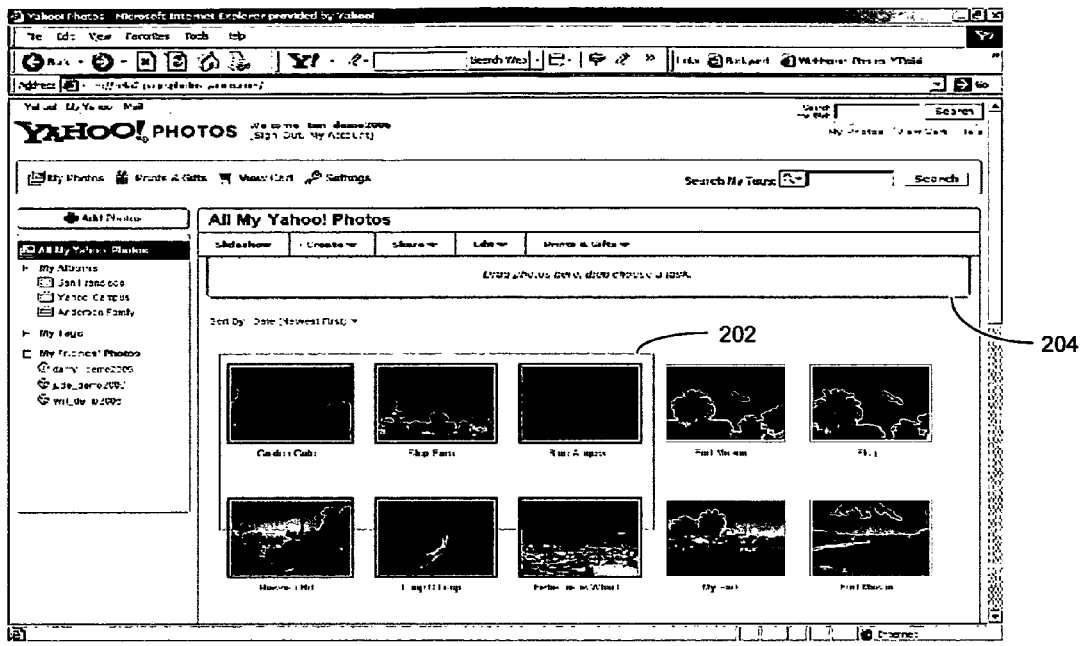
FIGS. 2A-2D illustrate methods for moving one or more photos to valid drop targets on a website within a browser according to embodiments of the present invention.

FIGS. 2A-2D illustrate methods for moving one or more photos to valid drop targets on a website within a browser according to embodiments of the present invention. FIG. 2A illustrates a method for selecting one or more photos on a website within a browser. As shown in FIG. 2A, the photo browser window includes a directory of photos in the left column, a plurality of photos, a photo tray 204, and a set of operations a user may operate on photos in the right column. In one example, to select a group of six photos, the left mouse button is held down and drag over the group of six thumbnail images. The six photos selected are highlighted by colored border around the thumbnail images 202. In other embodiments, the select function may be implemented by using the drag selection model or the control-and-shift selection model. Note that a photo tray is a working area for storing photo images selected by for performing a particular action. In this example, slide show, create, share, edit, or prints & gifts is a particular action a user may perform on the thumbnail images in the photo tray.

Figure 2B:
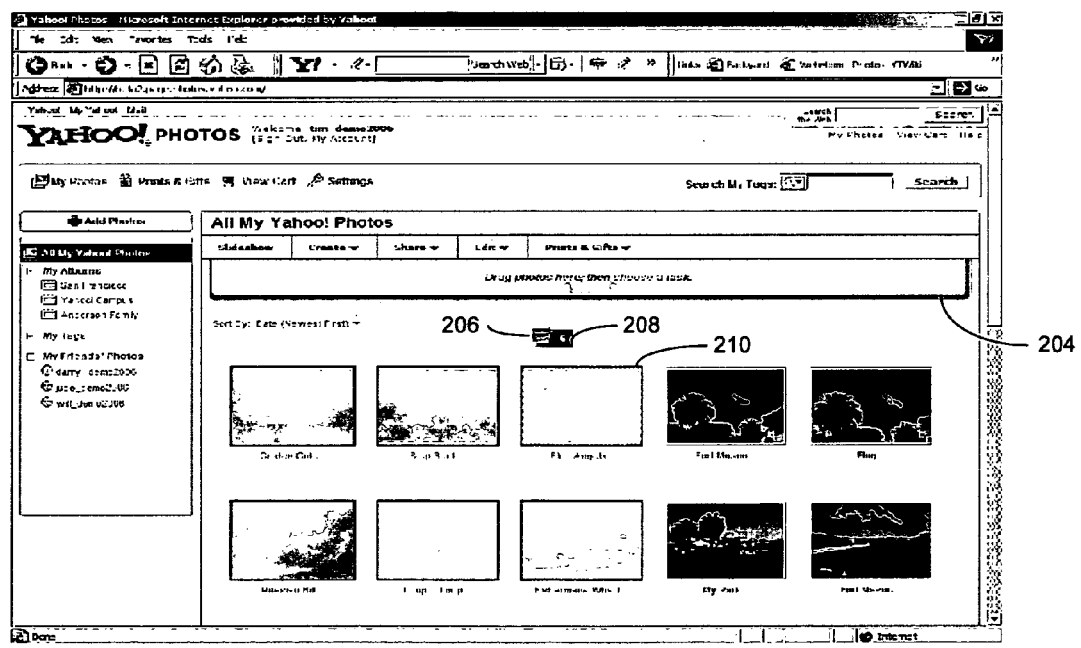

FIG. 2B illustrates a method for dragging one or more selected photos on a website within a browser. As shown in FIG. 2B, the group of six photos selected in FIG. 2A is being dragged to a drop target. The selected photos are collapsed into smaller thumbnail icons 206 to indicate their grouped selection while minimizing the amount of area occupied in the browser window during the drag operation toward a drop target. In addition, a count of the photos in transit 208 is shown to indicate the number of photos being dragged to the drop target. After the user initiates the drag action, the photo tray 204 is highlighted with a colored border to provide the user feedback that it is a legal drop target.

Figure 2C:
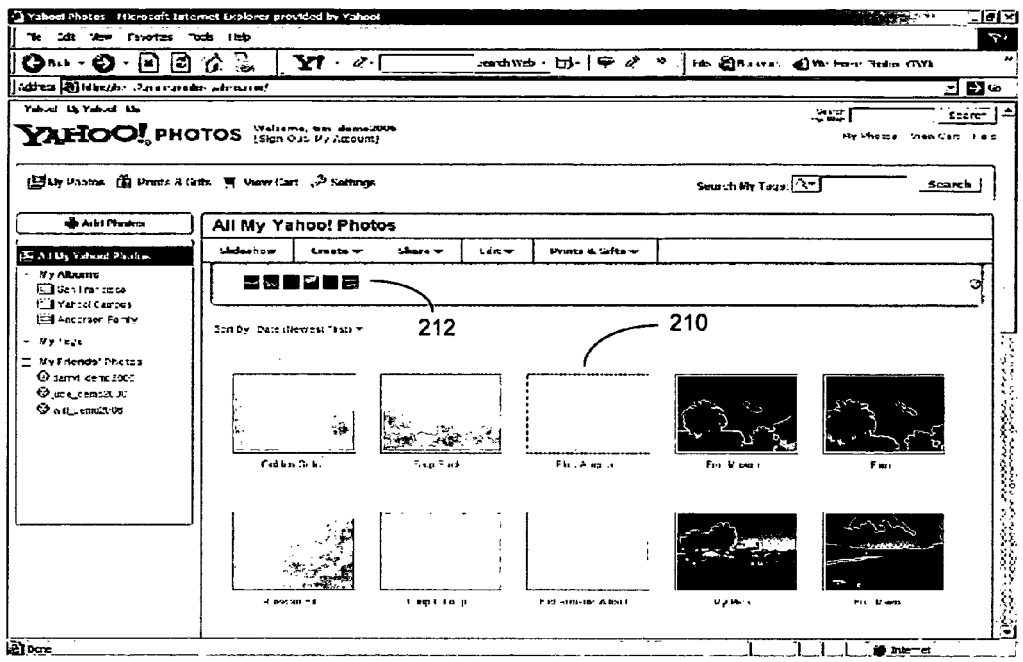

FIG. 2C illustrates dropping one or more photos in a photo tray on a website within a browser. As shown in FIG. 2C, after the group of photos of FIG. 2B are dropped in the photo tray, smaller thumbnails of the photos 212 are shown in the photo tray. Note that the original thumbnails of the photos in transit (as in FIG. 2B) and in the photo tray (as in FIG. 2C) are grayed-out 210, indicating that these photos have already been selected and are no longer selectable by the user. There are several reasons to gray-out the thumbnail images in the user viewable window after such images have been selected and moved to the photo tray. First, when a user scrolls up and down the browser window, the user may have forgotten which photos have been already selected. The grayed-out images would show the user the selected photos in the tray. Second, since the thumbnail images in the photo tray are rather small in order to conserve space in the browser window, it may be difficult for the user to tell which photos have been selected. The grayed-out images would provide a feedback about the user's selection.

Figure 2D:
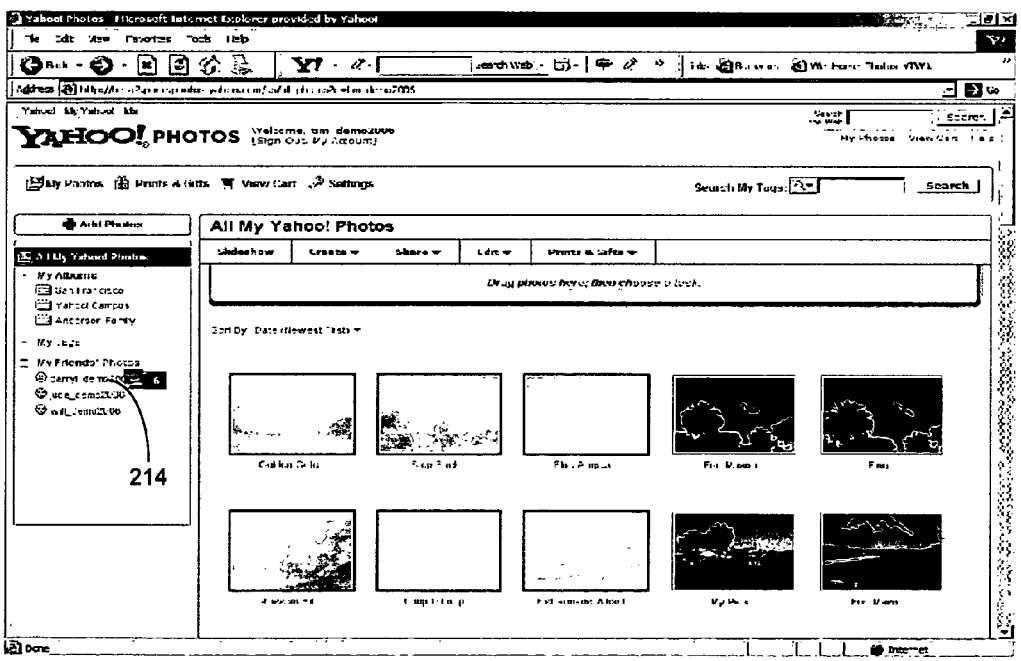

FIG. 2D illustrates dragging one or more selected photos to a user identifier for sharing photos on a website within a browser. In this example, the user identifier 214 is a friend's Yahoo! ID. This step enables allows the user to initial photo sharing with a friend who is logged in. In other embodiments, dragging and dropping photos over an album allow a user to conveniently add photos to an album in any navigation bar of the photo directories in the left column.

Figure 3A:
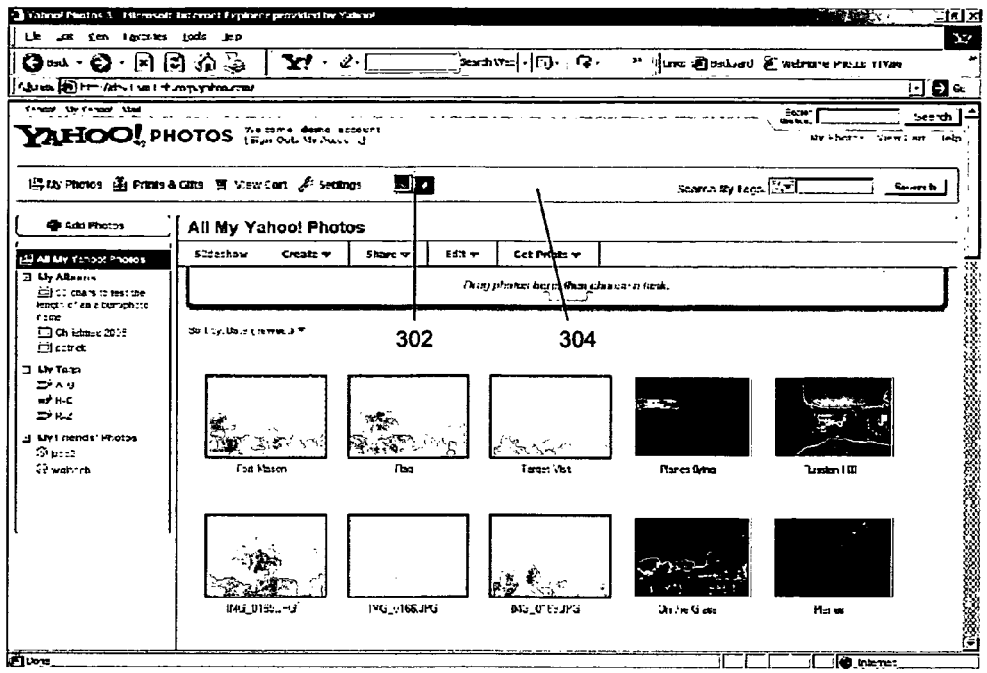
FIGS. 3A-3C illustrate methods for moving one or more photos to invalid drop targets on a website within a browser according to embodiments of the present invention.
Figure 3B:
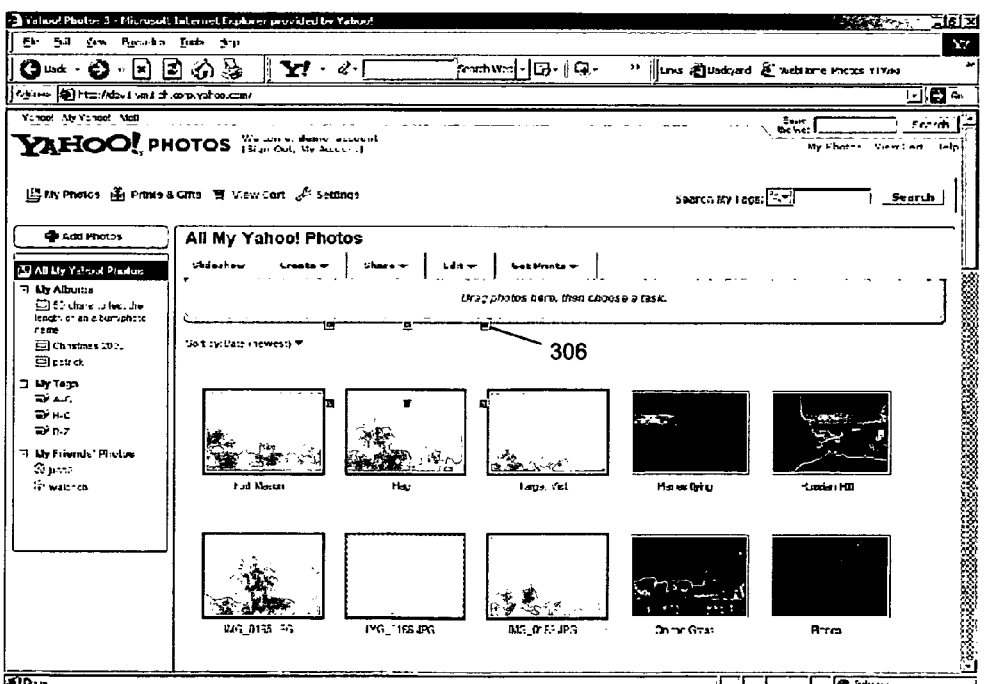
Figure 3C:
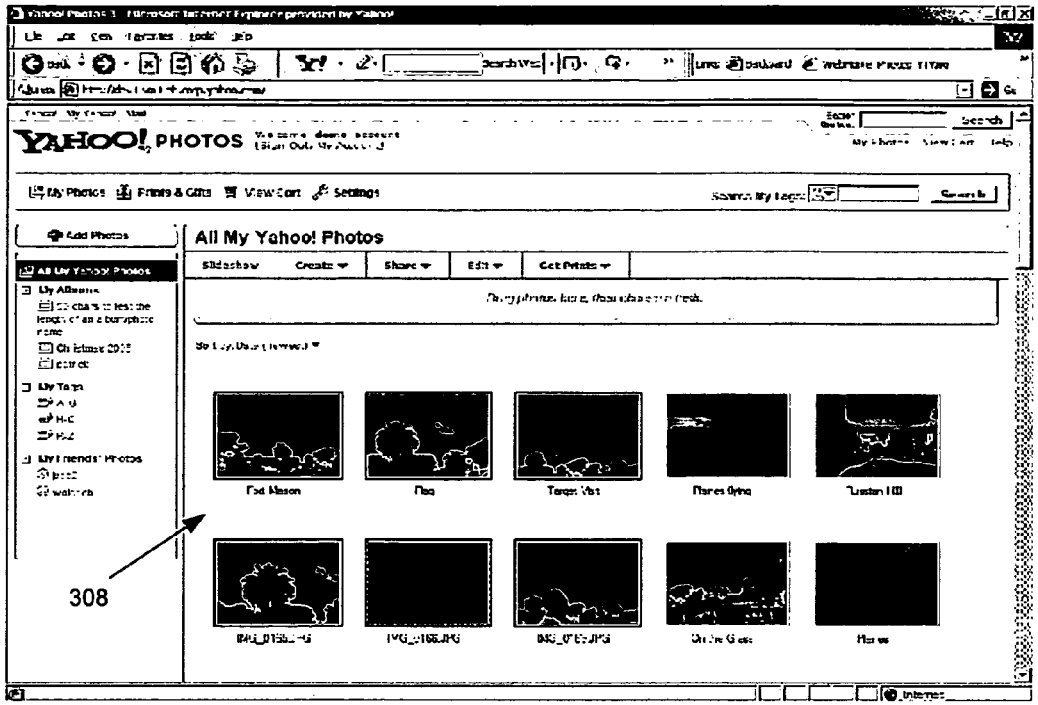

FIGS. 3A-3C illustrate methods for moving one or more photos to invalid drop targets on a website within a browser according to embodiments of the present invention. FIG. 3A illustrates dragging one or more photos to an invalid drop target. In this example, a group of ten photos 302 are dragged over an invalid drop target 304. Since the area 304 is an invalid drop target, no photos are moved to this location.

FIG. 3B illustrates dropping one or more photos on an invalid drop target. After the group of photos of FIG. 3A is dropped onto an invalid drop target, the small thumbnails of the dropped photos 306 are snapped back to their original position in the browser window. FIG. 3C illustrates the dropped photos of FIG. 3B have returned to their original locations 308 in the browser window. Note that in other embodiments, different types of animation may be implemented by using sound and graphics effects. For example, when a group of thumbnail images are dragged and dropped to a valid drop target, a sound effect of approval may be issued. On the other hand, when a group of thumbnail images are dragged and dropped to an invalid drop target, a sound effect of disapproval may be issued. Such sound effects produce an effective feedback to the user regarding the particular action performed.

Figure 4A:
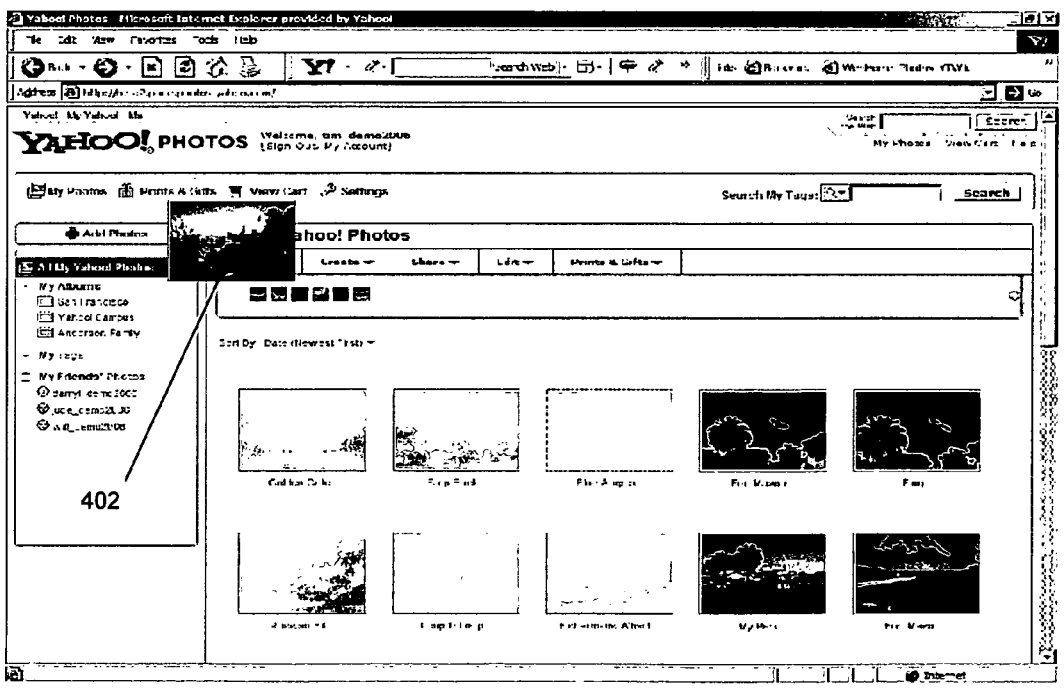
FIGS. 4A-4C illustrate the mouse-over and removal operations of thumbnail images in the photo tray according to embodiments of the present invention.
Figure 4B:
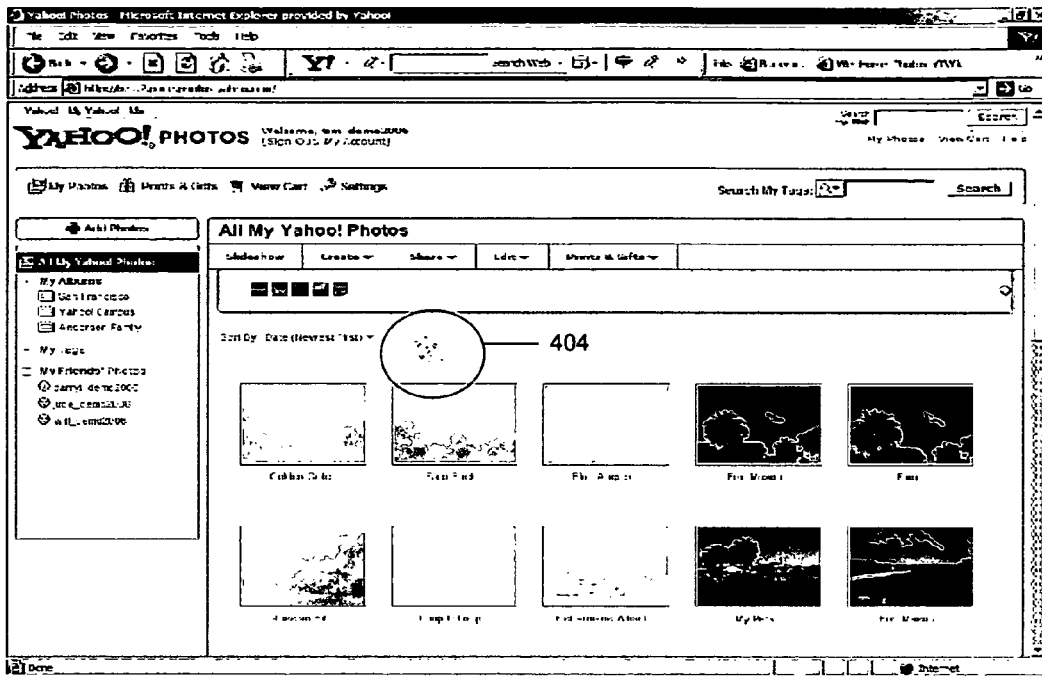
Figure 4C:
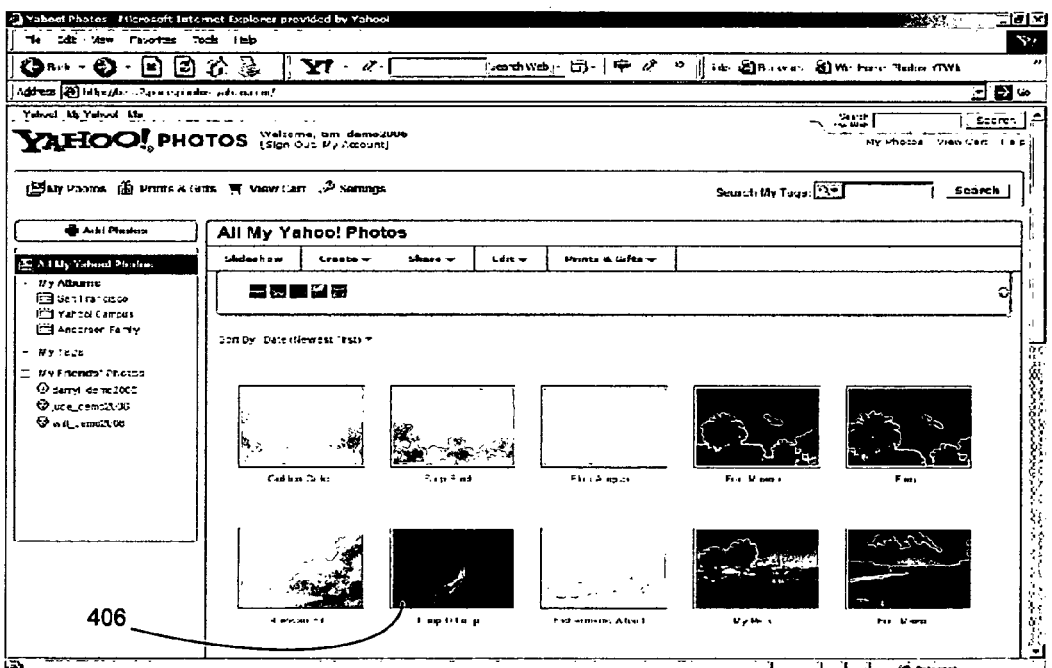

FIGS. 4A-4C illustrate the mouse-over and removal operations of thumbnail images in the photo tray according to embodiments of the present invention. FIG. 4A illustrates effects of hovering over a thumbnail photo in the photo tray. As shown in FIG. 4A, a user may hover over a thumbnail image in the photo tray to see a larger view of the image 402.

FIG. 4B illustrates removing a thumbnail image from the photo tray. In this example, a user may remove a specific image by dragging it out of the photo tray. After the specific thumbnail image is dragged out of the photo tray, there is one less image in the photo tray. Upon dragging and releasing the dragged thumbnail image outside of the photo tray, a "cloud" forms and then disappears as the deselected image animates back to its original position and state. At this point, the image is no longer visible in the tray. FIG. 4C illustrates the deselected image returns to its original form in the browser window.

Figure 5A:
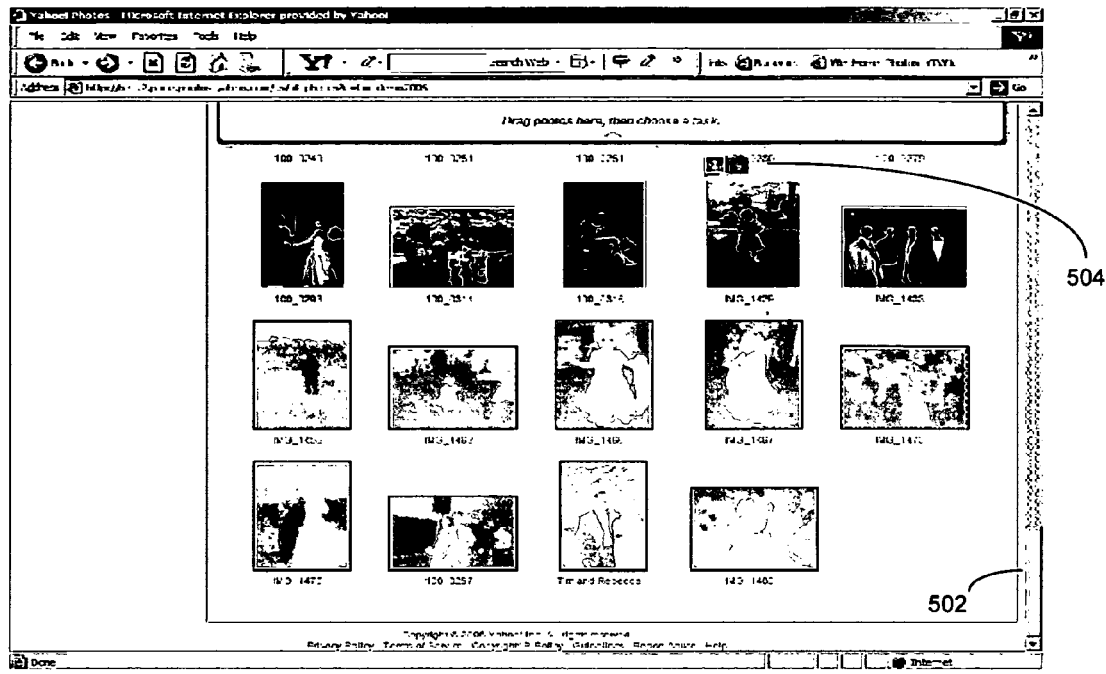
FIG. 5A illustrates a method for on-demand display of a photo tray on a website within a browser according to an embodiment of the present invention.

FIG. 5A illustrates a method for on-demand availability of a photo tray on a website within a browser according to an embodiment of the present invention. As shown in FIG. 5A, when the user has scrolled to the bottom of a webpage, as shown by scroll bar 502, or such that the tray is no longer in view, the initiation of a drag action, as indicated by the collapsed thumbnail images and its corresponding count 504, causes the photo tray to be brought into view automatically and to be highlighted for indicating to the user that it is a valid drop target. In the event the user does not drag item(s) to be dropped into the tray, it reverts to its original out-of-view position upon completion of the drag-drop operation. Such on-demand availability of the photo tray saves the user from scrolling back and forth between the images the user is interested to select and the photo tray.

Figure 5B:
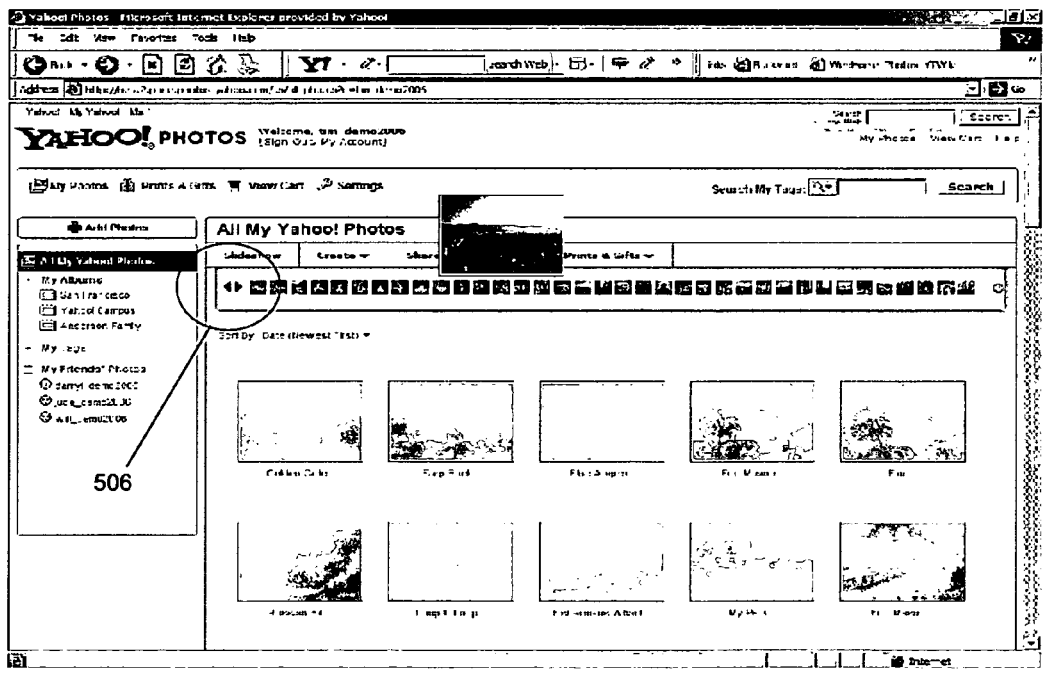
FIG. 5B illustrates a scrollable photo tray according to an embodiment of the present invention.

FIG. 5B illustrates a scrollable photo tray according to an embodiment of the present invention. In this example, if the photo tray contains more pictures than can be displayed at once within the current view, a pair of left and right arrows 506 is provided to enable the user to scroll the full selection of thumbnail images in the photo tray. In this example, each time the left or right arrow is pressed, the thumbnail images in the next page (width of the tray) is displayed in the photo tray.

Figure 6A:
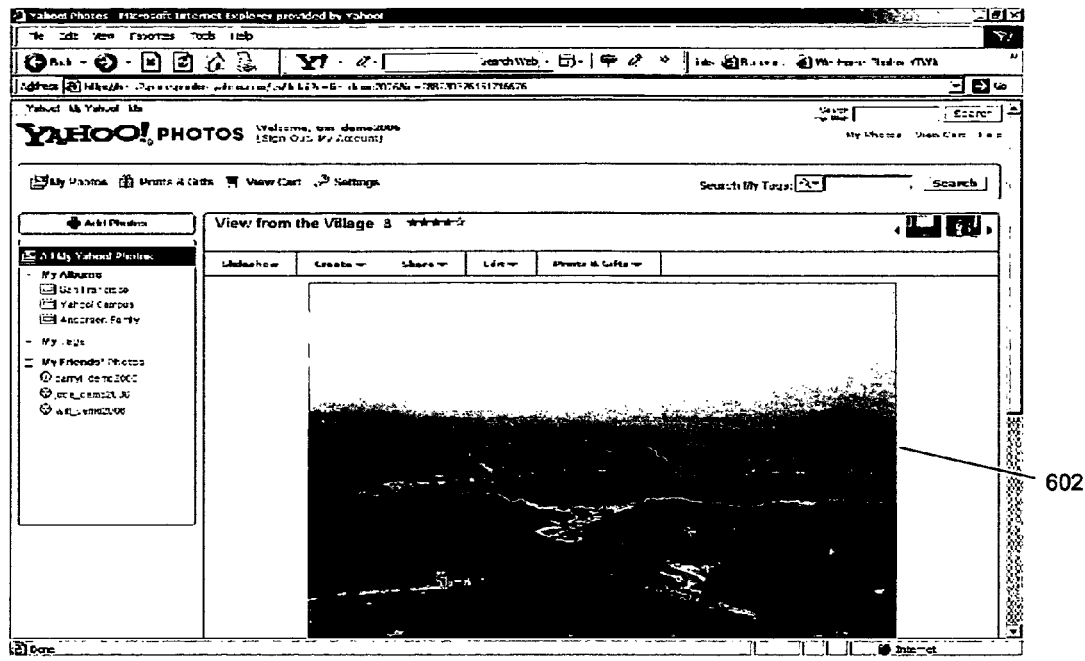
FIGS. 6A-6B illustrate a persistent photo tray according to an embodiment of the present invention.
Figure 6B:
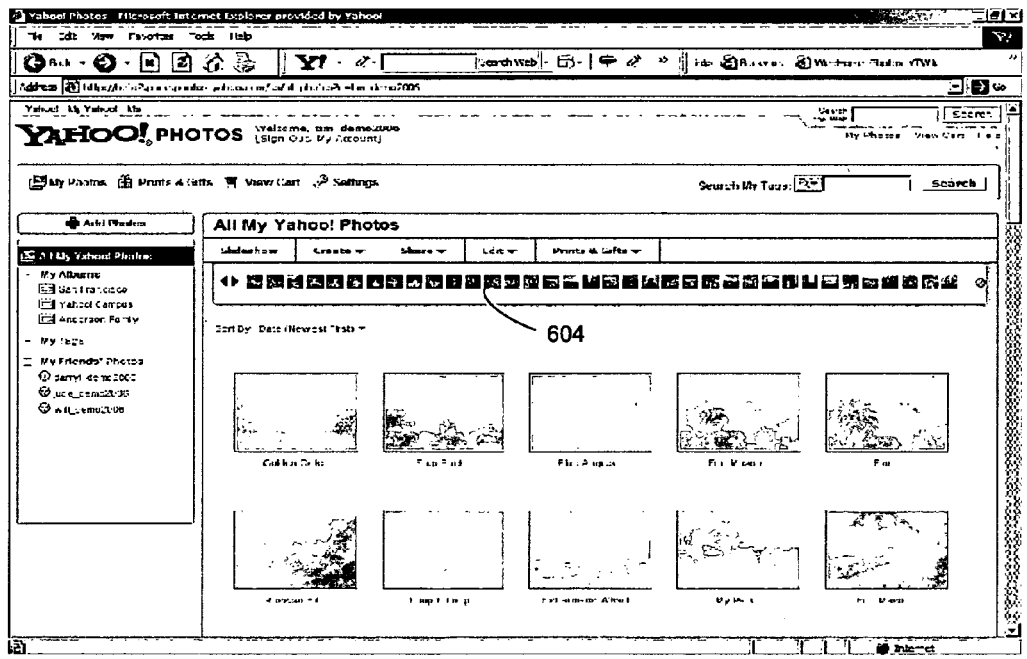

FIGS. 6A-6B illustrate a persistent photo tray according to an embodiment of the present invention. In one approach, browser cookies are used to keep track of the thumbnail images in the photo tray. A unique identifier is used for each photo in the browser. When a user opens a photo page that contains thumbnail images, the list of photos on the page is checked to determine if the identifiers of the photos that are being loaded match the corresponding identifiers of the thumbnail images in the tray as provided by the cookie. If there is a match between the original images in the user viewable window and the images in the tray, the two items are attached, and the user is given a visual indication that the original images are grayed-out and they are placed in the tray. When new photos are added to the tray, the cookie is updated to reflect the addition of the new thumbnail images. Similarly, when photos are removed from the tray, the cookie is again updated to reflect the removal of the images. Therefore, persistency of the photo tray is maintained by using a cookie to keep track of photos in the tray. The cookie is updated when images are added or removed from the photo tray.

As shown in FIG. 6A, the photo tray is persistent because the thumbnail images in the tray continue to remain in the tray even when the user navigates to another webpage. For example, the user may double-click a larger image of a photo 602 for viewing. Upon reviewing the larger image, the user returns to the All My Photos page, and the original photo selections 604 remain in the photo tray, as shown in FIG. 6B. In another example, the user may navigate to different photo albums and custom select multiple photos to be placed in the photo tray. In addition, the user may navigate to other web pages to gather additional information. The contents in the photo tray persist even though the web page displayed on the browser window changes.

Figure 7A:
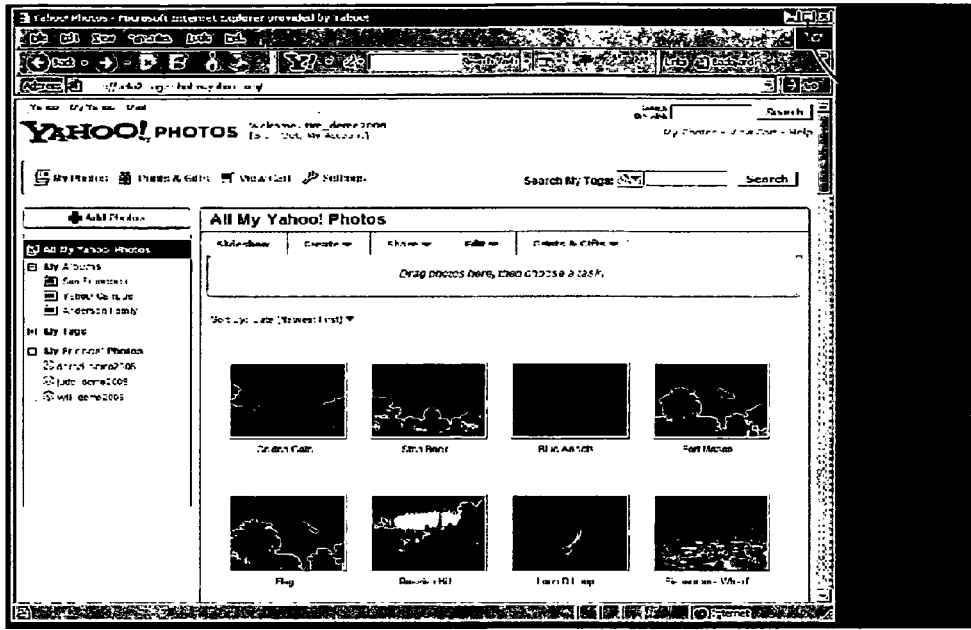
FIGS. 7A-7B illustrate a method for updating the number of photos in a user viewable window automatically according to an embodiment of the present invention.
Figure 7B:
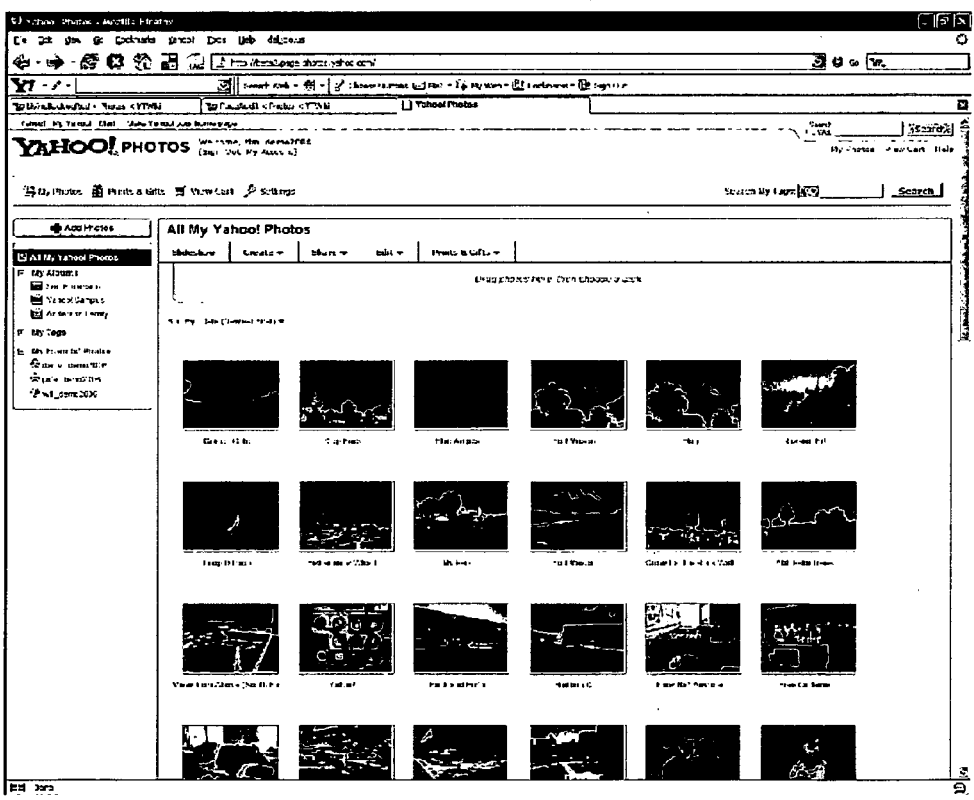

FIGS. 7A-7B illustrate a method for updating the number of photos in a user viewable window automatically according to an embodiment of the present invention. In one approach, the user viewable window is partitioned in a fluid grid layout. In other words, the user viewable window is divided into rows and columns according to the size of the thumbnail images to be placed in each grid location. The dimensions of the user viewable window are determined using JavaScript in the web browser. Based on the dimensions of the user viewable window and the dimensions of the grid for storing the thumbnail images, the number of images to be placed in the user viewable window is calculated automatically whenever the user viewable window size changes as a result of a browser event, such as a window resize event. After the browser had determined that additional thumbnail images need to be displayed, it uses JavaScript to determine the images currently within view of the user, retrieves the URLs of the images, and loads the images from the locations indicated by the URLs. Once all images have been loaded for the given page, the JavaScript detaches itself from the browser to reduce consumption of processing power and thus makes the system more efficient.

As shown in FIG. 7A, the user viewable window contains two rows and each row contains four photos. This user viewable window is not maximized as there are still blank spaces on the right hand side of the browser window. When the user enlarges the window by clicking the maximize button at the upper right hand corner or resizes the browser window, the user viewable window is automatically reflowed to have four rows and each row contains six photos as shown in FIG. 7B. The application calculates the maximum number of photos that can be fitted in the new user viewable window, and it automatically loads only the photos that are currently viewable within the browser window. Note that the user viewable window also adjusts automatically in a similar but reverse manner when the browser window reduces in size.

Figure 8A:
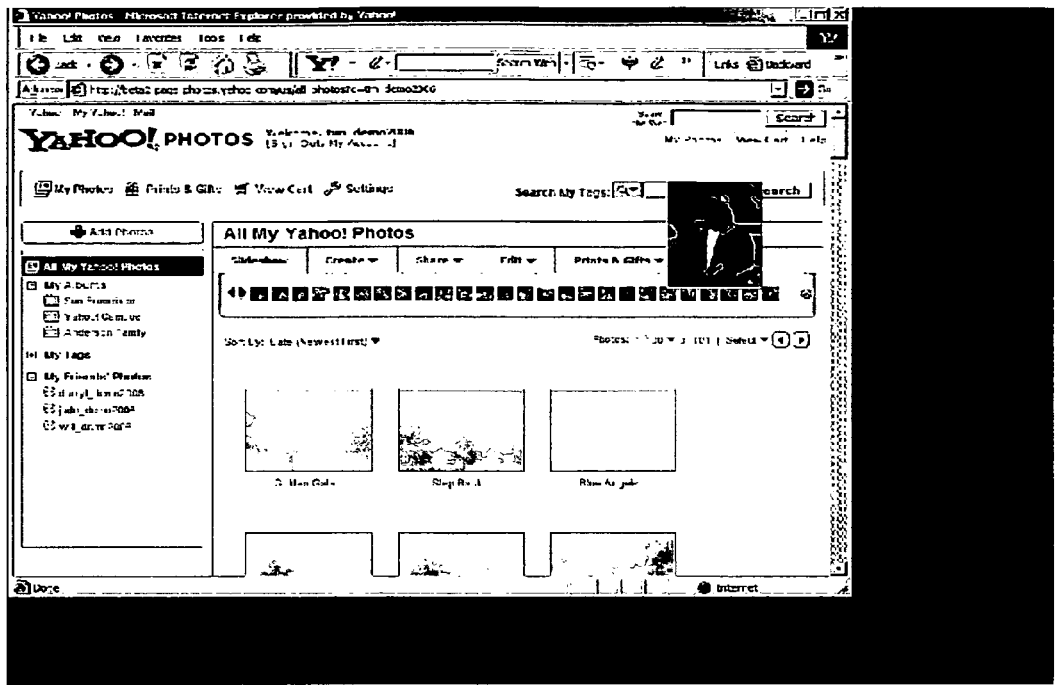
FIGS. 8A-8C illustrate a method for adjusting the width of the photo tray automatically according to an embodiment of the present invention.
Figure 8B:
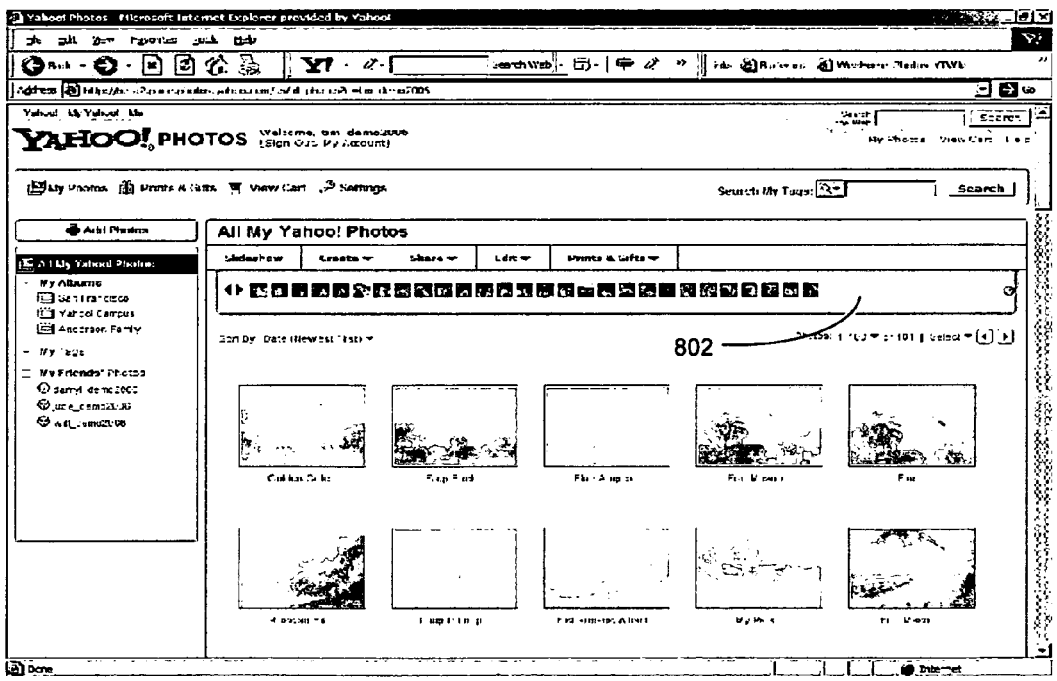
Figure 8C:
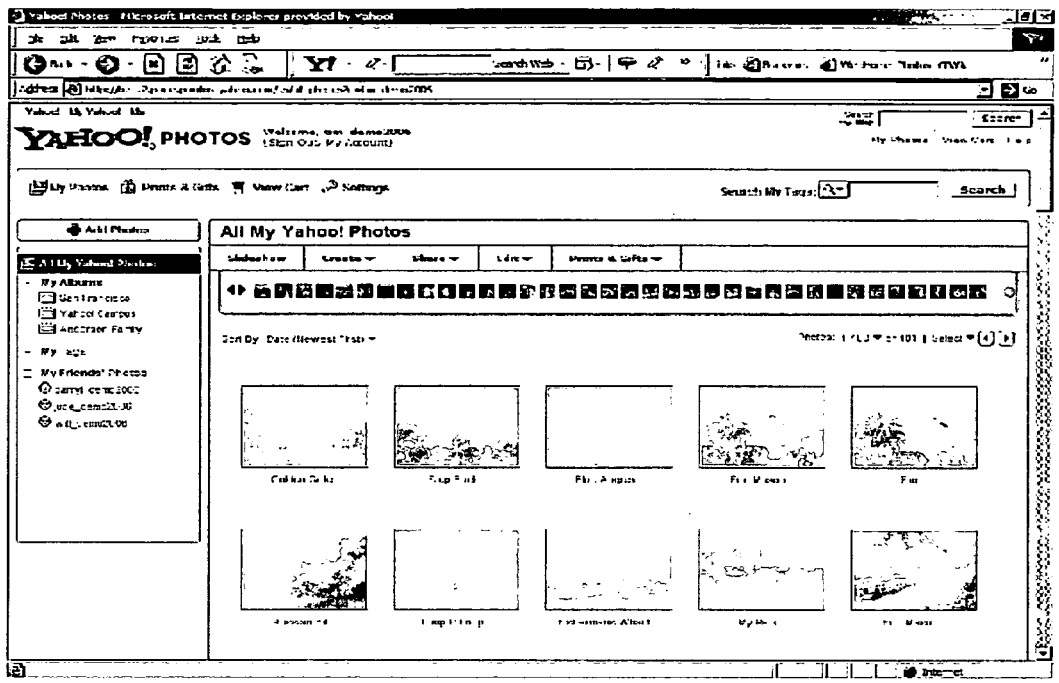

FIGS. 8A-8C illustrate a method for adjusting the scrolling behavior of the photo tray automatically according to an embodiment of the present invention. In this example, the method for adjusting the width of the photo tray is similar to the method for adjusting the number of thumbnail images to be displayed in a user viewable window upon a browser resize event discussed above, except that the photo tray stores the small thumbnail images in just one row. As shown in FIG. 8A, the browser window does not occupy the entire screen initially, leaving spaces both on the right hand side and at the bottom of the screen. The photo tray typically stores the photos in the sequence they were added and shows the most recent photos that have been moved into the tray. When the user clicks the maximize window button or when the browser window is resized, the browser window enlarges to fill the entire screen, as shown in FIG. 8B. In some circumstances this can leave certain space, as indicated by the arrow 802, in the photo tray temporarily. As a result, the photo tray will scroll automatically to show more photos. In this example, the user has scrolled the tray fully to the right, showing the last photo on the right-hand side, and then enlarged the window making more viewing space available. FIG. 8C illustrates the photo tray after it has been automatically adjusted and filled.

Figure 9A:
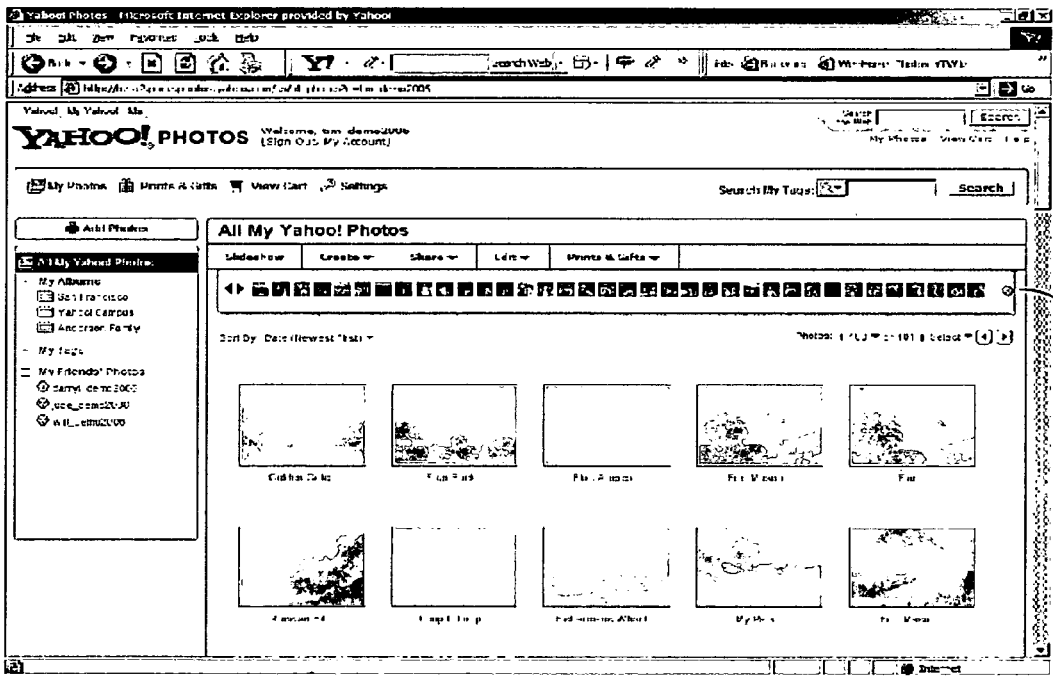
FIGS. 9A-9C illustrate a method for clearing the photo tray according to an embodiment of the present invention.
Figure 9B:
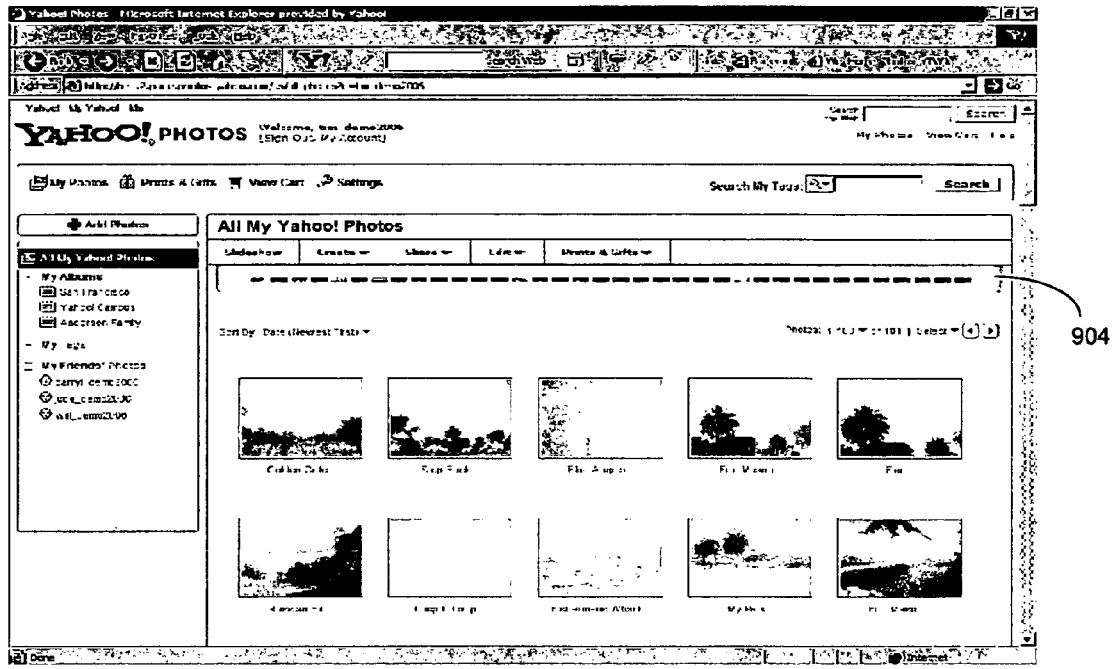
Figure 9C:
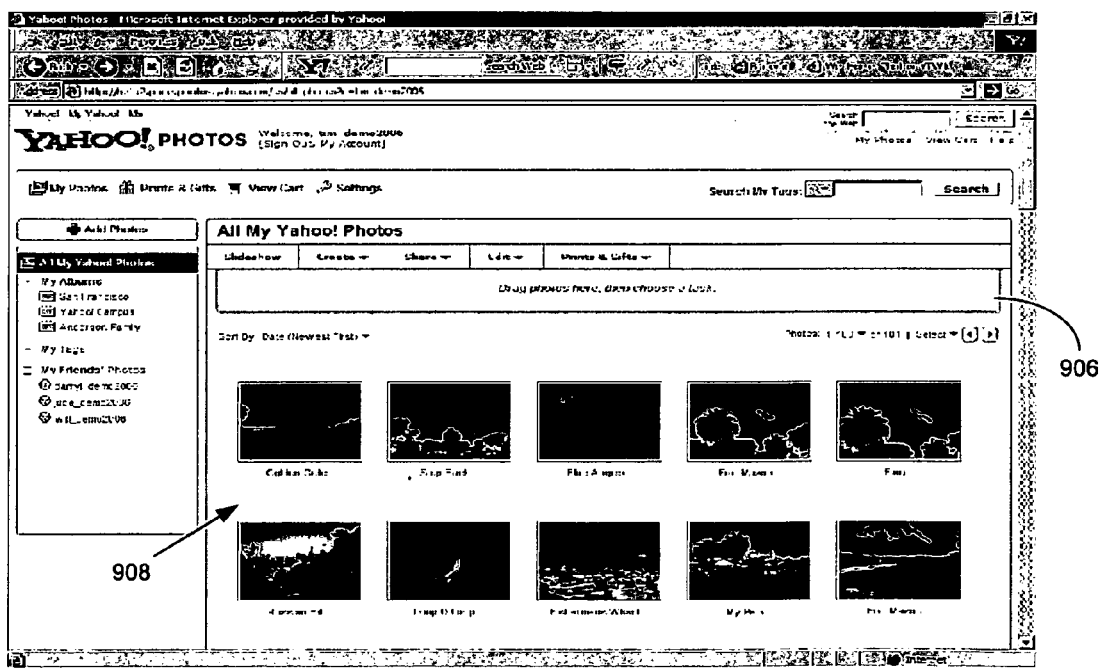

FIGS. 9A-9C illustrate a method for clearing the photo tray according to an embodiment of the present invention. FIG. 9A illustrates a view of the browser window prior to clearing the photo tray. The browser window includes the photo tray with small thumbnail images and its corresponding grayed-out images in the user viewable window below the photo tray. One way to clear the entire thumbnail images in the photo tray is by clicking the clear (x) button at the right side of the tray.

FIG. 9B illustrates a view of the photo tray shortly after clicking the clear button. The photo tray collapses as the bottom edge moves upward over the photos, first hiding, and then removing the thumbnail images. As shown in FIG. 9B, the photo tray is in the process of moving upward (has moved up partially) and therefore (partially) hides the thumbnail images. FIG. 9C illustrates a view after the photo tray has been cleared. After the thumbnail images in the photo tray are cleared, the photo tray is empty and the corresponding images in the user viewable window are no longer grayed-out.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are to be seen as references to suitable means for providing the described functionality rather than indicative of a strict logical or physical structure or organization.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A method comprising:
    receiving, from a user, a select command for identifying at least one thumbnail image in a browser window on a website;
    receiving, from the user, a drag command for dragging the at least one thumbnail image to a drop target;
    automatically causing, via a computing device, the at least one thumbnail image to be displayed as at least one reduced size thumbnail image during said dragging and while in transit to the drop target based on the drag command, said reduced size thumbnail image is displayed in a reduced display size from the at least one thumbnail image's display size prior to receiving the drag command, wherein the drop target, based on the drag command, is automatically brought into view, and is based at least in part on the at least one thumbnail image; and
    dropping, via the computing device, the at least one reduced size thumbnail image to the drop target in response to a drop command from the user.

2. The method of claim 1 further comprising:
    causing a display of the at least one reduced size thumbnail image as a scaled down thumbnail image in the drop target; and
    causing a display of the at least one thumbnail image in the browser window as a grayed-out thumbnail image.

3. The method of claim 1 further comprising:
causing a display of a corresponding count of the at least one reduced size thumbnail image indicating the number of photos in transit; and
dropping the at least one reduced size thumbnail image and the corresponding count to the drop target in response to a second drop command from the user.

4. The method of claim 1 further comprising:
determining a number of thumbnail images for display in a user viewable window automatically in response to a change in size of the user viewable window; and
causing a display of the number of thumbnail images in the user viewable window.

5. The method of claim 4, wherein the determining comprises:
partitioning the user viewable window into rows and columns according to dimensions of the user viewable window and dimensions of each thumbnail image; and
computing the number of thumbnail images for filling the rows and columns of the user viewable window.

6. The method of claim 4, wherein the causing the display of the number of thumbnail images comprises:
retrieving URLs of the corresponding thumbnail images; and
loading the corresponding thumbnail images for display in the user viewable window.

7. The method of claim 1 further comprising:
highlighting a valid drop target in response to a determination that the valid drop target is permitted to receive the at least one reduced size thumbnail image; and
dropping the at least one reduced size thumbnail image to the valid drop target in response to a third drop command from the user.

8. The method of claim 7 further comprising:
causing a display of no visual modification to an invalid drop target in response to a determination that the invalid drop target is not permitted to receive the at least one reduced size thumbnail image;
dropping the at least one reduced size thumbnail image to the invalid drop target in response to a fourth drop command from the user; and
returning the at least one reduced size thumbnail image to its original location in the browser window.

9. The method of claim 1 further comprising:
pointing a cursor over a thumbnail image in the photo tray in response to a point command from the user; and
causing a display of the thumbnail image as a scaled up thumbnail image.

10. The method of claim 1 further comprising a step from the group consisting of:
receiving a selection of a photo in response to the user dragging a cursor over an area covering the photo;
receiving a selection of a photo in response to the user clicking the photo directly; and
receiving a selection of all photos in the browser screen in response to the user depressing Control and A keys together.

11. The method of claim 1, wherein receiving, from a user, a select command for identifying at least one thumbnail image comprises drawing a selection rectangle around a region that includes the at least one thumbnail-image.

12. A system comprising:
one or more servers for interfacing between client devices through a communication network, the one or more servers including at least one computer-readable memory comprising computer-executable instructions, the computer-executable instructions for:
receiving, from a user, a select command for identifying at least one thumbnail image in a browser window on a website;
receiving, from the user, a drag command for dragging the at least one-thumbnail image to a drop target;
automatically causing the at least one thumbnail image to be displayed as at least one reduced size thumbnail image during said dragging and while in transit to the drop target based on the drag command, said reduced size thumbnail image is displayed in a reduced display size from the at least one thumbnail image's display size prior to receiving the drag command, wherein the drop target, based on the drag command, is automatically brought into view, and is based at least in part on the at least one thumbnail image; and
dropping the at least one reduced size thumbnail image to the drop target in response to a drop command from the user; and
a processor for executing the computer-executable instructions.

13. The system of claim 12, wherein the at least one computer-readable memory further comprises computer-executable instructions for:
causing a display of the at least one reduced size thumbnail image as a scaled down thumbnail image in the drop target; and
causing a display of the at least one thumbnail image in the browser window as a grayed-out thumbnail image.

14. The system of claim 12, wherein the at least one computer-readable memory further comprises computer-executable instructions for:
causing a display of a corresponding count of the at least one reduced size thumbnail image indicating the number of photos in transit; and
dropping the at least one reduced size thumbnail image and the corresponding count to the drop target in response to a second drop command from the user.

15. The system of claim 12, wherein the at least one computer-readable memory further comprises computer-executable instructions for:
determining a number of thumbnail images for display in a user viewable window automatically in response to a change in size of the user viewable window; and
causing a display of the number of thumbnail images in the user viewable window.

16. The system of claim 15, wherein determining comprises:
partitioning the user viewable window into rows and columns according to dimensions of the user viewable window and dimensions of each thumbnail image; and
computing the number of thumbnail images for filling the rows and columns of the user viewable window.

17. The system of claim 15, wherein the causing the display of the number of thumbnail images comprises:
retrieving URLs of the corresponding thumbnail images; and
loading the corresponding thumbnail images for display in the user viewable window.

18. The system of claim 12, wherein the at least one computer-readable memory further comprises computer-executable instructions for:
highlighting a valid drop target in response to a determination that the valid drop target is permitted to receive the at least one reduced size thumbnail image; and
dropping the at least one reduced size thumbnail image images to the valid drop target in response to a third drop command from the user.

19. The system of claim 18, wherein the at least one computer-readable memory further comprises computer-executable instructions for:
  causing the display of no visual modification to an invalid drop target in response to a determination that the invalid drop target is not permitted to receive the at least one reduced size thumbnail image;
  dropping the at least one reduced size thumbnail image to the invalid drop target in response to a fourth drop command from the user; and
  returning the at least one reduced size thumbnail image to its original location in the browser window.

20. The system of claim 12, wherein the at least one computer-readable memory further comprises computer-executable instructions for:
  pointing a cursor over a thumbnail image in the photo tray in response to a point command from the user; and
  causing a display of the thumbnail image as a scaled up thumbnail image.

21. The system of claim 12, wherein the at least one computer-readable memory further comprises computer-executable instructions from the group consisting of:
  computer-executable instructions for receiving a selection of a photo in response to the user dragging a cursor over an area covering the photo;
  computer-executable for receiving a selection of a photo in response to the user clicking the photo directly; and
  computer-executable for receiving a selection of all photos in the browser screen in response to the user depressing Control and A keys together.

22. A computer-readable storage medium storing executable program code, when executed by a processor, perform a method for:
  receiving, from a user, a select command for identifying at least one thumbnail image in a browser window on a website;
  receiving, from the user, a drag command for dragging the at least one thumbnail image to a drop target;
  automatically causing the at least one thumbnail image to be displayed as at least one reduced size thumbnail image during said dragging and while in transit to the drop target based on the drag command, said reduced size thumbnail image is displayed in a reduced display size from the at least one thumbnail image's display size prior to receiving the drag command, wherein the drop target, based on the drag command, is automatically brought into view, and is based at least in part on the at least one thumbnail image; and
  dropping the at least one reduced size thumbnail image to the drop target in response to a drop command from the user.

23. The computer readable storage medium of claim 22 further comprising program code for:
  causing a display of the at least one reduced size thumbnail image as a scaled down thumbnail image in the drop target; and
  causing a display of the at least one thumbnail image in the browser window as a grayed-out thumbnail-image.

24. The computer readable storage medium of claim 22 further comprising program code for:
  causing a display of a corresponding count of the at least one reduced size thumbnail image indicating the number of photos in transit; and
  dropping the at least one reduced size thumbnail image and the corresponding count to the drop target in response to a second drop command from the user.

25. The computer readable storage medium of claim 22 further comprising program code for:
  determining a number of thumbnail images for display in a user viewable window automatically in response to a change in size of the user viewable window; and
  causing a display of the number of thumbnail images in the user viewable window.

26. The computer readable storage medium of claim 25, wherein determining comprises:
  partitioning the user viewable window into rows and columns according to dimensions of the user viewable window and dimensions of each thumbnail image; and
  computing the number of thumbnail images for filling the rows and columns of the user viewable window.

27. The computer readable storage medium of claim 25, wherein causing the display of the number of thumbnail images comprises:
  retrieving URLs of the corresponding thumbnail images; and
  loading the corresponding thumbnail images for display in the user viewable window.

28. The computer readable storage medium of claim 22 further comprising program code for:
  highlighting a valid drop target in response to a determination that the valid drop target is permitted to receive the at least one reduced size thumbnail image; and
  dropping the at least one reduced size thumbnail image to the valid drop target in response to a third drop command from the user.

29. The computer readable storage medium of claim 28 further comprising program code for:
  causing a display of no visual modification to an invalid drop target in response to a determination that the invalid drop target is not permitted to receive the at least one reduced size thumbnail-image;
  dropping the at least one reduced size thumbnail image to the invalid drop target in response to a fourth drop command from the user; and
  returning the at least one reduced size thumbnail image to its original location in the browser window.

30. The computer readable storage medium of claim 22 further comprising program code for:
  pointing a cursor over a thumbnail image in the photo tray in response to a point command from the user; and
  causing a display of the thumbnail image as a scaled up thumbnail image.

31. The computer readable storage medium of claim 22 further comprising program code from the group consisting of:
  receiving a selection of a photo in response to the user dragging a cursor over an area covering the photo;
  receiving a selection of a photo in response to the user clicking the photo directly; and
  receiving a selection of all photos in the browser screen in response to the user depressing Control and A keys together.

* * * * *